Nov. 7, 1961 — W. W. BEAM — 3,007,598
TANK CONSTRUCTION
Filed June 24, 1958 — 3 Sheets-Sheet 1

INVENTOR.
Walter W. Beam
BY
Owen, McDougall, Williams & Hersh
Attorneys

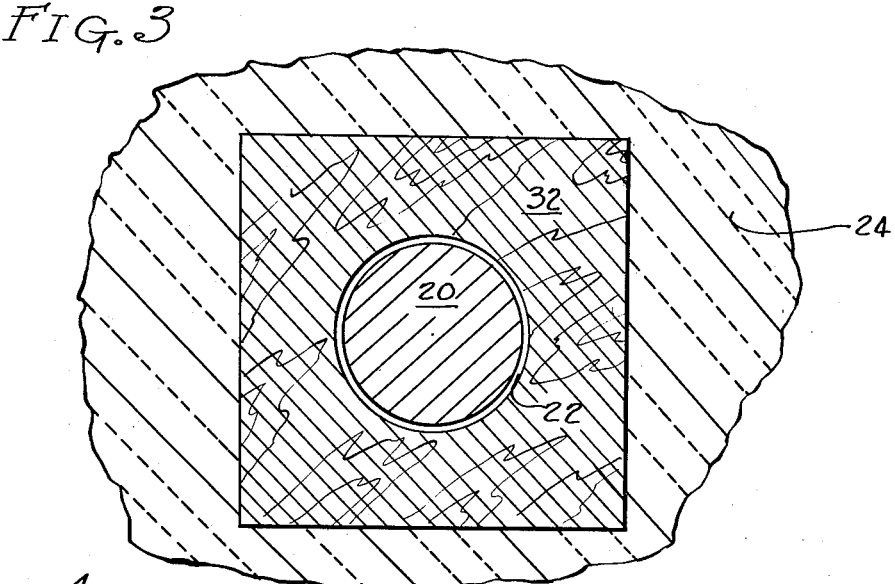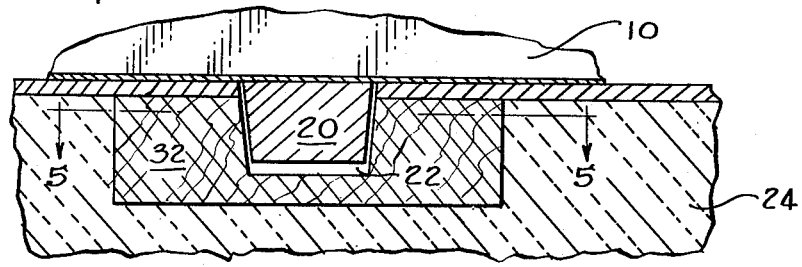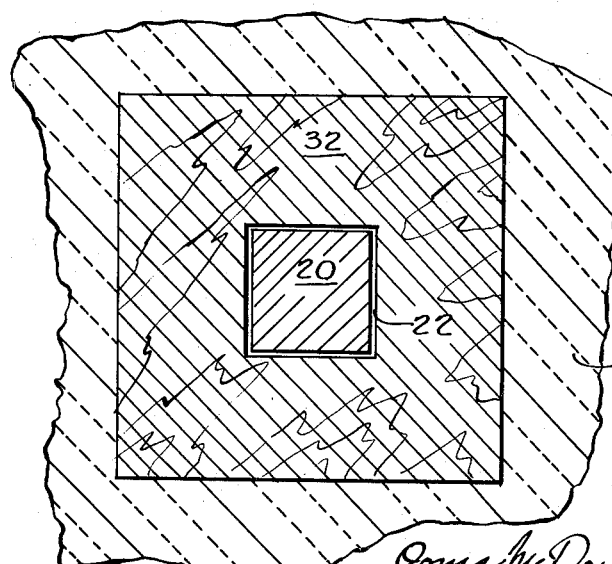

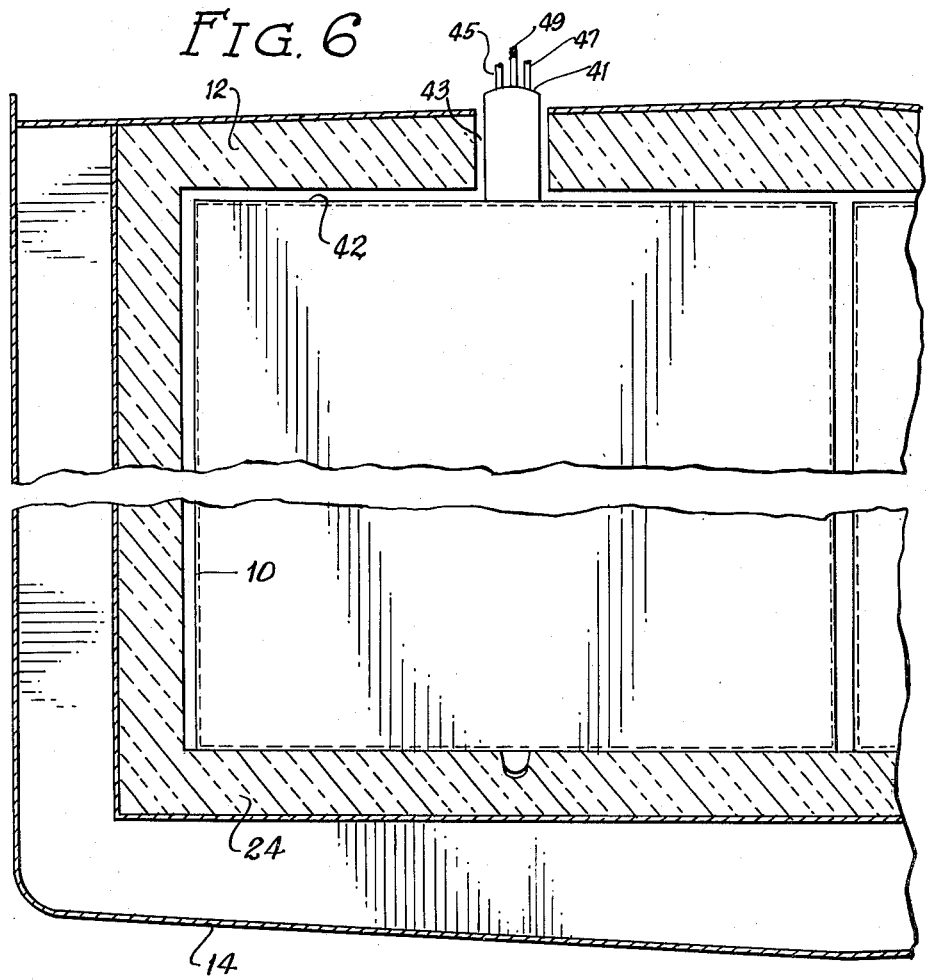

United States Patent Office 3,007,598
Patented Nov. 7, 1961

3,007,598
TANK CONSTRUCTION
Walter W. Beam, Ponca City, Okla., assignor, by mesne assignments, to Conch International Methane Limited, Nassau, Bahamas, a corporation of the Bahamas
Filed June 24, 1958, Ser. No. 744,225
14 Claims. (Cl. 220—15)

This invention relates to the storage and transportation of a liquid which must be maintained at extremely low temperature, and it relates more particularly to a construction wherein use is made of one or more large tanks for the storage and transportation of a cold boiling, liquefied gas, such as a natural gas.

Since certain gases are available in various localities in amounts in excess of that required, and while deficiencies are known to exist in other areas, it is desirable to provide a means for the transportation or transmission of the gas from the source of plentiful supply to the area where a deficiency exists. In the case of natural gas, this transmission has been achieved by pipeline where transportation is effected of the gaseous material while it is in a gaseous state. While transmission by pipeline is practical between sections connected by land, pipeline operation is not so practical between sections which are separated by a large body of water, or between relatively isolated sections even when connected by land. Thus, an industry is in the stage of development for the transportation of natural gas by means other than pipeline.

Because of the large volume of the natural gas per heat content, it is uneconomical to transport the gas while in a gaseous state. It is known that an equivalent amount of gas can be reduced to about 1/600 of its volume when it is transformed from its gaseous state to its liquefied state at equivalent pressure. Thus, the system that is being developed comprises the liquefaction of the natural gas at the source of plentiful supply for transportation in the liquefied state to an area where the deficiency exists, where it can be reformed into a gas for use.

Transportation of the liquefied natural gas must, of necessity, be made with the liquid housed in suitable tanks. When transportation of the liquefied gas is effected in large volume, it becomes impractical to provide for transportation in tanks under substantial pressure. At a result, the liquefied gas will be housed in containers of large capacity at about atmospheric pressure or slightly above which, in the case of natural gas composed mostly of methane, means that the liquefied gas will have to be maintained at a temperature below its bubble point or at a temperature below about —240° F., depending somewhat upon the amount of heavier hydrocarbons in the gas (liquefied methane boils at —258° F. at atmospheric pressure).

The invention will be described with reference to the storage and transportation of liquefied natural gas in aluminum tanks of many thousands of barrels' capacity, one or more of which will be housed in the hold of a ship which has been lined with a thick layer of thermal insulation to minimize heat loss and vaporization of the liquefied gas from the storage tanks. The storage tanks will be formed of aluminum, alloys of aluminum, copper, stainless steel or the like austenitic steels which are capable of retaining their ductility at the low temperature conditions existing, as distinguished from the loss in ductility which would occur in steel plate of which such large storage tanks are ordinarily formed. For most efficient utilization of the limited space available in the hold of a ship or the like storage and transportation means, it is desirable to make use of tanks of square or rectangular shape, although tanks of other contours including round may be employed.

It will be apparent that a number of problems exist which are peculiar to the described situation. In the use of metal tanks of such large capacity in a moving vessel, it is desirable to maintain complete control with respect to the location of the tanks in a manner to avoid bumping or shifting movements responsive to the erratic movements of the transportation means, such as the pitching and rolling movements of a ship on water. If it were otherwise, the cargo-carrying tanks would themselves soon become demolished and the insulation as well as the ship would be subject to damage to the end that an impractical and dangerous situation might develop.

The complexity of the problem of harnessing tanks in the insulated space is increased by the necessity to provide for relative movements of the tanks in response to the expansions and contractions which will take place as the tanks change in temperature. This need arises from the fact that the tanks will usualy be installed in the insulated space while at ambient temperature, which may range from a temperature of about 70–100° F., but will be reduced to a temperature of about —240 to —258° F. when filled with the cargo of liquefied gas. Such change in temperature will naturally result in considerable contraction in the metal forming the walls of the tanks when the tanks are filled with the liquefied gas, and corresponding expansions when the tanks are emptied and allowed to rise in temperature.

Thus, it is an object of this invention to provide a tank construction in a moving vehicle, such as a ship, wherein the tanks can be stationarily mounted in the ship while permitting the tanks naturally to expand and retract responsive to temperature change.

More specifically, it is an object of this invention to provide a mounting for ship transportation of tanks of large capacity adapted to house a cargo which has to be maintained at extremely low temperature and which permits movement of the tanks in response to the forces of nature in expansion and contraction but which maintains the tanks in a predetermined position within the ship's hold notwithstanding the variable movements of the ship on water.

These and other objects and advantages of this invention will hereinafter appear and for purposes of illustration, but not of limitation, an embodiment of the invention is shown in the accompanying drawings, in which—

FIGURE 3 is a sectional view taken along the line 3—3 of FIGURE 2;

FIGURE 4 is a sectional view similar to that of FIGURE 2 showing a modification in the mounting structure;

FIGURE 5 is a sectional view taken along the line 5—5 of FIGURE 4; and

FIGURE 6 is a schematic sectional elevational view similar to that of FIGURE 1 showing a modification in the tank construction.

Figure 1:
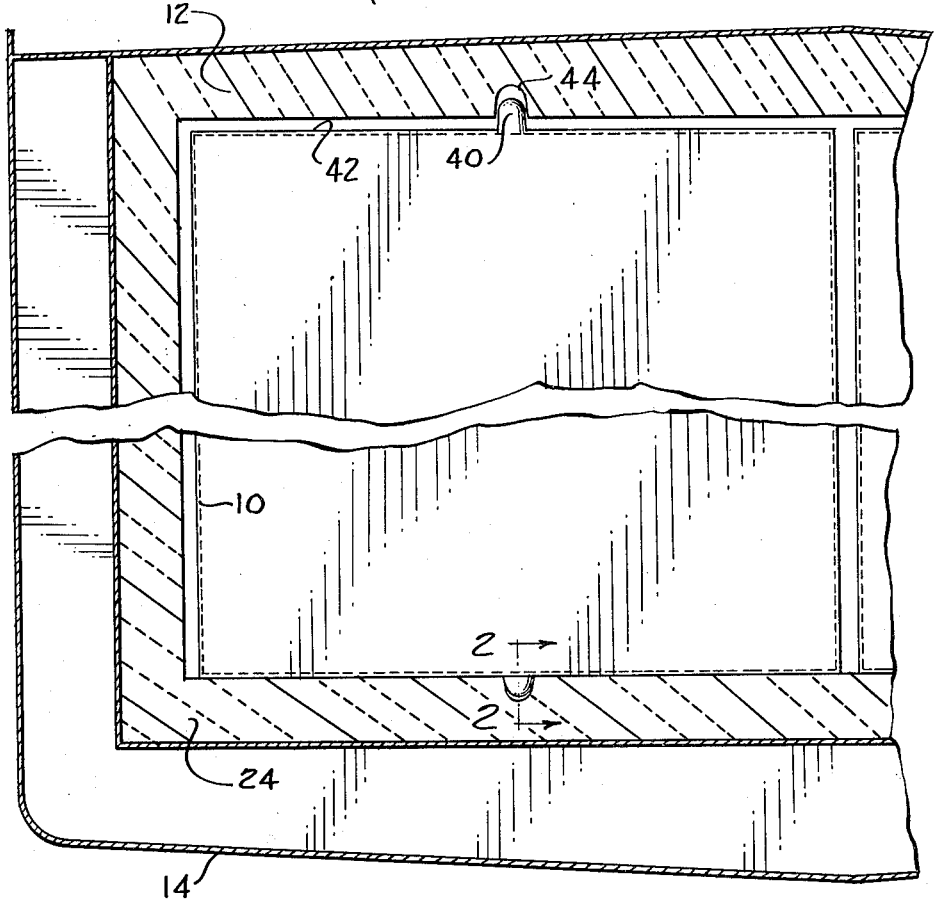
FIGURE 1 is a schematic elevational view in section of a portion of a ship's hold, showing the tanks in mounted relation therein.

The concepts of this invention are embodied in a construction whereby large metal tanks 10 are maintained within an insulated space 12 in a manner to maintain the tanks in a predetermined position within the insulated space notwithstanding the varied movement of the conveyance means, such as the pitching and rolling movement of the ship 14 while permitting free movement of the tanks as required by the normal expansions and contractions that take place as the tanks are cooled down to extremely low temperature upon filling with the cold cargo or as the tanks heat up upon removal of the cargo from contact therewith.

In my copending application filed concurrently herewith and entitled "Storage Tank and Means for Support of Same," description is made of a key and keyway arrangement along the bottom wall of the tank with the keys of the tank and the keyways in the flooring being alinged lengthwise of the ship along the center of the tank to provide substantial resistance to sidewise thrust, while the center key and keyway of each tank is dimensioned to provide an interfitting relationship which operates to resist relative movements between the tank and its support in the lengthwise direction, thereby to maintain a centered relationship with the tank while permitting contractions and expansions relative to the center lines in the horizontal directions, and permitting free expansions and contractions of the tank in the vertical direction.

In accordance with the practice of this invention, the center of the tank 10 is stabilized in its position within the insulated space 12 by providing the bottom wall of the tank with an outwardly extending bulbous portion 20 which is adapted to be received in fitting relationship within a correspondingly shaped and dimensioned recess 22 formed in the insulation flooring 24.

Figure 2:
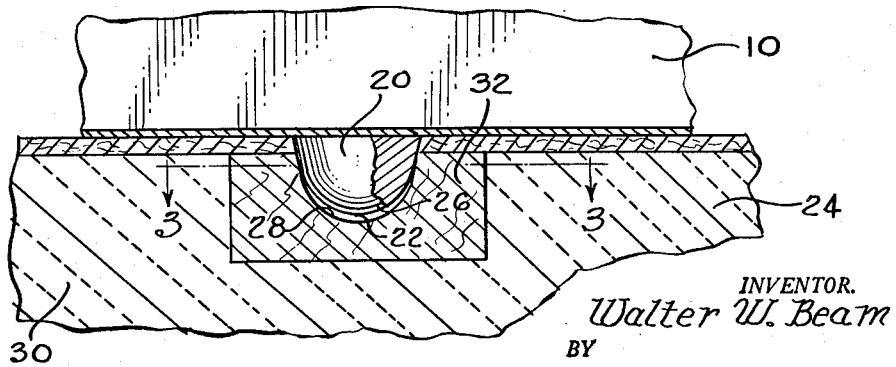
FIGURE 2 is an enlarged sectional elevational view taken along the line 2—2 of FIGURE 1.

The bulbous portion may be formed to square, rectangular, or other polygonal shape in cross-section, as illustrated in FIGURES 4 and 5 but, if other means are available to prevent rotational movement of the tank about its center, it is preferred to form the bulbous portion of curvilinear section, such as a hemispherical section (FIGURES 1, 2 and 3) or a conical section or the like. If of a polygonal section, the side walls may be formed vertical but it is preferred to form the side walls with an inward incline to provide a construction of pyramidal shape. When formed curvilinear as described, or of polygonal shape, the lower end 26 of the bulbous portion will be of smaller dimension than the entrance to the recess portion 22, thereby to enable easier insertion of the bulbous portion into the recess and a relationship will be provided which will guide the tank to its proper position within the insulated space. This is of extreme importance when working with tanks of many hundreds or thousands of barrels' capacity because room will not be available for manual or mechanical guidance of the tank into position of use, especially when the insulated space is filled with such tanks in closely spaced-apart relation.

Since the tanks will rest primarily on the floor 24, as distinguished from the bulbous portion 20 which is seated in guiding relationship within the recess, it is not necessary for the bulbous portion to extend downwardly completely to fill the recess, but it is desirable to provide for as close a fit as possible between the side walls of the bulbous portion and the corresponding walls 28 of the recess 22, especially when assembled at ambient temperature.

Reductions in temperature which thereafter take place to cause contraction of the metal walls of the tank will be insignificant in the central section forming the bulbous portion so that the interfitting relationship between the bulbous portion and the recess in the flooring will serve to continue to hold the tank in its centered relationship within the hold space. The larger portions of the tank wholly outside of the bulbous portions will tend to shift in the direction toward and away from the bulbous portion upon contraction and expansion, respectively. Thus ths interfitting relationship at the tank's center will operate to maintain control of the movement of the tank to prevent displacement in response to the rolling and pitching movements of the ship or the like movements of other conveyance means, while permitting free contraction and expansion movements to take place both horizontally and vertically, without loss of control of the tank.

Since the forces existing will bear most heavily on the insulated flooring defining the recess in which the bulbous portion is received, it is desirable to strengthen the flooring about the recess, especially when the flooring is formed of a relatively thick layer 30 of a highly porous wood having good themal insulating characteristics, such as balsa wood, quippo or the like. For this purpose, the insulation layer is inlaid with a block 32 of hardwood, such as a block built up of laminated hardwood plies dimensioned to be greater in width and length than the cross-sectional dimension of the recess at its largest portion, and dimensioned to have a depth greater than the depth of the recess so that the recess 22 can be preformed in the wooden or molded block prior to insertion into the floor, although the recess may be formed therein after the insulation floor has been installed and the proper location for the tank has been determined.

A similar central bulbous portion 40 may also be employed in the top wall 42 of the tank to be received within a recess 44 provided in the framework of the ship to locate the top wall of the tank with respect to the insulated storage space. The bulbous portion 40 in the top wall can take the form of an elongate trunk 41 received in fitting relation within an opening 43 in the ship, as represented by an opening in the deck through which the trunk extends. When the trunk portion is of sufficient dimension, the various attachments to the tank such as the filling lines 45, the emptying lines 47, the pressure relief valves 49 and the like, may be connected therethrough.

Since the tank rests on the floor, the bottom bulbous portion 20 will always remain in operative engagement within its receiving recess 22 but, to compensate for the amount of contraction that can take place through the height of the tank, it is important to make use of a bulbous portion 40 at the top which extends into its receiving recess or opening for a distance greater than the amount of shrinkage calculated to take place in the height of the tank so as to maintain a desirable contacting relationship therebetween throughout all conditions of use.

It will be apparent from the foregoing description that a means is provided for harnessing the tanks in an insulated space to maintain the tanks in a predetermined location therein in a manner to resist reative movements in response to movements of the conveyance means, but which frees the tanks for movements in expansion and contraction. It will be understood that for best control, the cooperating walls of the bulbous portion and the recess should be in substantially interfitting relation throughout the conditions of use so that stability can be provided at the opposite ends of the tank. For this purpose, it is desirable to make use of minimum incline in the side wall sections of the bulbous portion and its receiving recess so as to minimize the spaced relationship developed therebetween upon contraction.

It will be understood that changes may be made with respect to the materials employed in the construction of the tank or the insulation, and that the tanks may be adapted for use with materials other than liquefied natural gas but in which the materials will subject the tanks to considerable change in temperature. It will be further understood that changes may be made in the details of construction, arrangement and operation without departing from the spirit of the invention, especially as defined in the following claims.

I claim:

1. In the storage and transportation of a material which needs to be maintained at a temperature differing widely from the ambient temperature, comprising a housing formed with a bottom wall and a top wall spaced vertically from the bottom wall to define a storage space therebetween, one or more storage tanks of large capacity in which the material is received, the walls of which are impervious to the material and are subject to noticeable expansions and contractions in response to temperature change, said tanks being located within the space between said top and bottom walls, the thermal insulation between the tank and the walls of the housing including a layer over the bottom wall to provide a floor upon which the tank rests, means mounting the tank within the insulated space without rigid attachment to the housing and insulation thereby to permit the tank continuously to rest upon the floor without movement from a stabilized position within the insulated storage space while remaining free for expansion and contraction movements in response to temperature change, said means comprising a bulbous portion in one of the elements including the bottom wall of the tank and the adjacent floor upon which it rests in alignment with about the central vertical axis of the tank and a recess in the other of the elements in alignment with the bulbous portion and dimensioned to correspond thereto for receiving the bulbous portion in substantially fitting relationship within the recess.

2. The assembly as claimed in claim 1 in which the recess is formed to a depth greater than the depth of the bulbous portion so that the tank will rest on the floor while being centered about the bulbous portion in the recess to permit expansion and contraction movements of the tank relative to its centered relation.

3. The assembly as claimed in claim 1 in which the bulbous portion and the receiving recess are of polygonal shape in cross-section.

4. The assembly as claimed in claim 1 in which the bulbous portion and the recess are rectangular in cross-section.

5. The assembly as claimed in claim 1 in which the bulbous portion is in the form of an inverted pyramidal section.

6. The assembly as claimed in claim 1 in which the bulbous portion comprises a portion of a hemisphere.

7. The assembly as claimed in claim 1 in which the bulbous portion is an inverted frusto-conical section.

8. An assembly as claimed in 1 which includes a similar bulbous portion extending upwardly from the central portion of the top wall of the tank and a member forming a part of the housing above the top wall of the tank having an opening dimensioned to receive the bulbous portion in substantially fitting relationship therein.

9. An assembly as claimed in claim 8 in which the bulbous portion in the top wall extends into said opening for a distance greater than the amount of contraction in height calculated to take place in the tank due to temperature change whereby a contacting relationship is constantly maintained.

10. An assembly as claimed in claim 8 in which the housing comprises the insulated hold of a ship having a deck portion spaced from the top wall of the tank.

11. The assembly as claimed in claim 10 in which the opening in the housing operatively receiving the bulbous portion in the top wall comprises an opening in the deck of the ship through which the bulbous portion extends.

12. An assembly as claimed in claim 11 in which the bulbous portion comprises a trunk extending from the top of the tank through the opening in the deck.

13. The assembly as claimed in claim 1 in which the bulbous portion comprises a part of the bottom wall of the tank to extend downwardly therefrom and the recesses in the corresponding portion of the floor upon which the tank rests.

14. In the storage and transportation of a liquid which needs to be maintained at a temperature differing widely from the ambient temperature, a housing formed with a bottom wall and a top wall spaced vertically from the bottom wall to define a storage space therebetween, one or more metal storage tanks of large capacity in which the liquid is housed, the metal walls of which are impervious to the material and are subject to noticeable expansions and contractions in response to temperature change, said tanks being located within the space between the top and bottom walls of the housing, thermal insulation between the tank and the walls of the housing including a layer over the bottom wall to provide a floor upon which the tank rests, means mounting the tank within the insulated space without rigid attachment to the housing and insulation whereby the tank rests continuously upon the floor without movement from a stabilized position within the insulated storage space while remaining free for expansion and contraction movements in response to temperature change, said means comprising a flat bottom wall on the tank to rest upon the supporting floor over a substantial surface area and a bulbous portion in one of the elements including the top wall of the tank and the adjacent top wall of the housing in alignment with about the central vertical axis of the tank and a corresponding recess in the other of the elements in axial alignment with the bulbous portion and dimensioned to correspond thereto for receiving the bulbous portion in substantially fitting relationship within the recess and dimensioned to have the bulbous portion extend into the recess by an amount greater than the change in the height of the tank when reduced from ambient temperature to the temperature of the liquid contained therein.

References Cited in the file of this patent

UNITED STATES PATENTS

| | | |
|---|---|---|
| 2,060,941 | Kline et al. | Nov. 17, 1936 |
| 2,436,411 | Weaver | Feb. 24, 1948 |
| 2,798,364 | Morrison | July 9, 1957 |
| 2,799,425 | Werker | July 16, 1957 |
| 2,807,143 | Schnellhardt | Sept. 24, 1957 |
| 2,823,822 | Altman | Feb. 18, 1958 |
| 2,896,416 | Henry | July 28, 1959 |

FOREIGN PATENTS

| | | |
|---|---|---|
| 781,631 | Great Britain | Aug. 21, 1957 |
| 1,032,210 | France | Mar. 25, 1953 |